April 13, 1943.  E. H. CLARK  2,316,562
MIXING AND WHIPPING APPARATUS
Filed Dec. 5, 1939  3 Sheets-Sheet 1

INVENTOR.
EDWARD H. CLARK
BY Gourley & Budlong
ATTORNEY.

April 13, 1943.   E. H. CLARK   2,316,562
MIXING AND WHIPPING APPARATUS
Filed Dec. 5, 1939   3 Sheets-Sheet 2

INVENTOR.
EDWARD H. CLARK
BY Gourley & Badlong
ATTORNEY.

April 13, 1943.  E. H. CLARK  2,316,562
MIXING AND WHIPPING APPARATUS
Filed Dec. 5, 1939   3 Sheets-Sheet 3
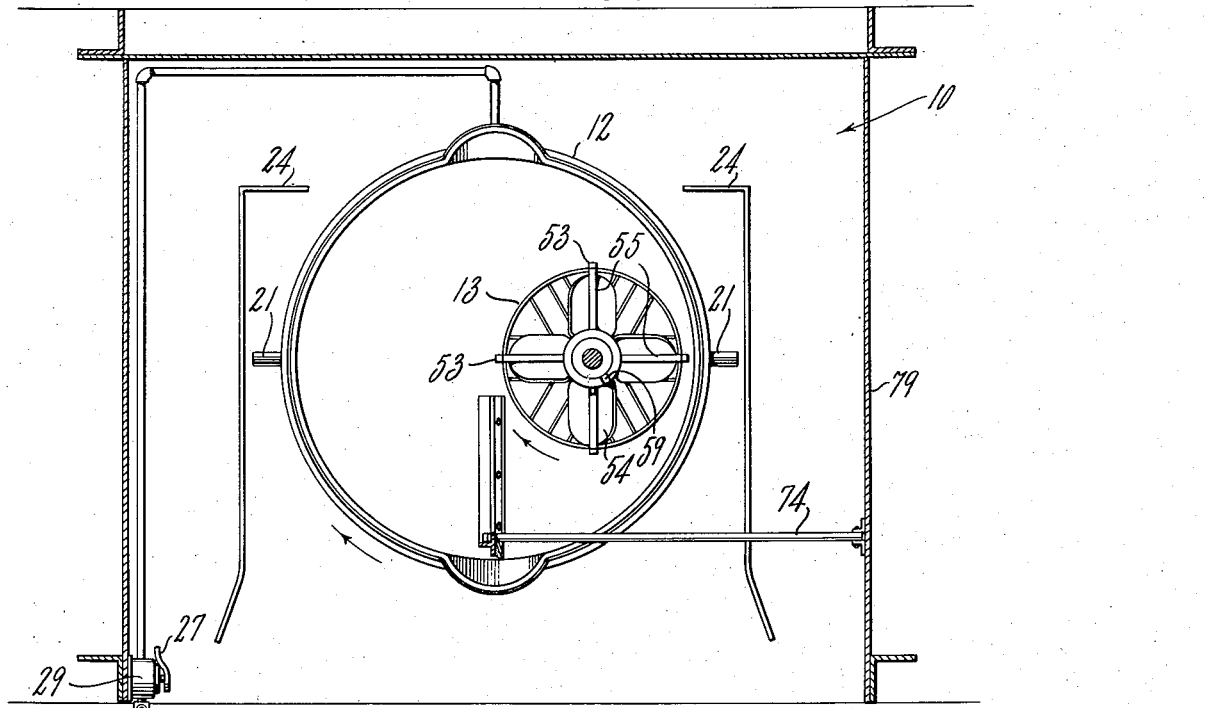
Fig. 3.
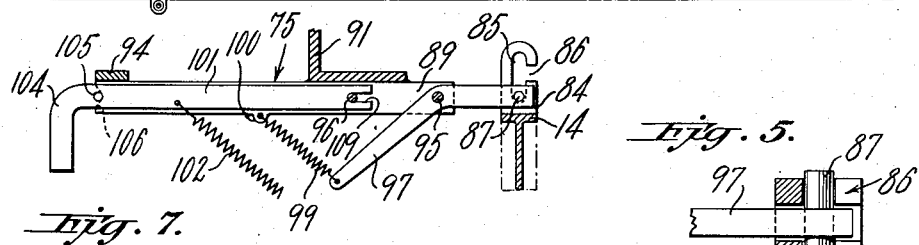
Fig. 7.
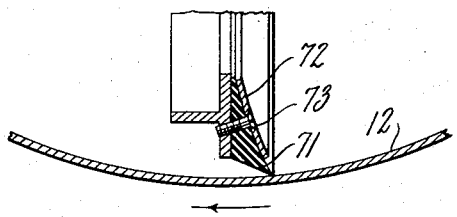
Fig. 4.
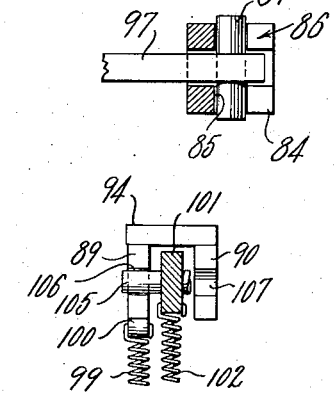
Fig. 5.
Fig. 6.
INVENTOR.
EDWARD H. CLARK
BY Gourley & Budlong
ATTORNEY.

Patented Apr. 13, 1943

2,316,562

UNITED STATES PATENT OFFICE 2,316,562

MIXING AND WHIPPING APPARATUS

Edward H. Clark, Mishawaka, Ind., assignor to United States Rubber Company, New York, N. Y., a corporation of New Jersey Application December 5, 1939, Serial No. 307,595

18 Claims. (Cl. 259—85)

This invention relates to mixing and whipping apparatus and more particularly to apparatus to be used in the processing of rubber latex or other liquid material rendered in a frothed or foamed condition.

In the manufacture of sponge rubber articles from latex, a certain large scale commercial procedure involves the introduction of air or other gas into the latex in the form of bubbles, the maintenance of the bubbly character and of the density of the latex foam during the processing operations, and the destabilizing or sensitizing of the latex foam preparatory to coagulating it in a mold or other shaping device. The latex foam may be cast, before coagulation, into the desired shape to form sponge-like articles such as cushions or mattresses and the like. For a satisfactory commercial product it is especially desirable that the cells be evenly distributed and of similar size so as to form a homogeneous material throughout the article. It is therefore especially important that, during the processing operations on the latex, the latex foam be accurately controlled to prevent breakdown of the air or gas bubbles and also to prevent premature coagulation.

The apparatus of the present invention is adapted to operate on a "prefrothed" latex, that is, a latex into which at least some air or gas has been previously beaten or otherwise introduced, although it may also be employed with a non-aerated latex composition to whip the latex initially into a foam. When "prefrothed" latex is introduced into the apparatus, there are usually variously sized bubbles which would tend to produce an uneven final product; also the latex foam is often of too high density, that is, insufficient air has been introduced therein. The present apparatus additionally whips the latex to produce a more uniform foam and may be controlled to beat more air thereinto, smooths out the consistency of the foam, agitates the foam without premature "setting up," thoroughly disperses any added ingredients, and at the same time maintains the desired temperature and humidity conditions of the latex.

When the latex foam has attained the desired consistency suitable destabilizing or delayed coagulating agents may be added to the compound as in the form of a paste, after which the apparatus disperses them evenly throughout the compound. In the usual commercial practice sensitizing agents are added which induce coagulation within a very short time after their addition to the latex foam, which necessitates rapid and gentle dispersion in order to render the foam in thoroughly prepared but still uncoagulated condition for pouring into molds.

The apparatus comprises generally a container for the "prefrothed" latex foam, a whip and mixer associated with the container, means for rotating the container and the whip in the same direction, means for preventing premature coagulation of the latex foam, means for preventing the formation of a film or crust of latex foam on the interior of the container, temperature and humidity controls, and partial destabilizing means.

Whereas the present mixing apparatus is adapted to the mixing and whipping of any foamable liquid, it is especially useful in processing coagulable foamable liquids, such as rubber latex. When latex is violently agitated mechanically, or when it is subjected to considerable friction, it has a tendency to coagulate. With ordinary beating apparatus, this tendency toward "setting up" the latex is augmented because of the violent impingement of the beater against the surface of the liquid and because of the lack of provision for agitating the entire mass. In addition a wave is often built up, which, when dealing with non-coagulable materials would have no effect on the behavior thereof, but which, when operating on unstable liquids like latex, has a tendency to induce coagulation. Furthermore, the ordinary beating apparatus causes the liquid to spatter against the sides of the container, which tends to coagulate a portion of the solids content of the liquid, thereby preventing subsequent manipulation in the liquid state. With the present apparatus, on the other hand, the desired results of beating further air into the latex foam, and of mixing the foam, are accomplished without the coagulation which is ordinarily attendant upon the use of the usual beating apparatus. For example, the mixing and whipping are accomplished without the production of a wave as the whip rotates within the container, since the container rotates co-directionally therewith. Furthermore, the apparatus includes a scraper which continually agitates portions of the liquid adjacent to the walls of the container. The scraper is so designed that the friction on the latex contacted by it is reduced to a minimum, thus further restraining the tendency toward coagulation.

The advantages of the present apparatus are especially apparent during the last stages of the processing operation, that is, after the sensitizing or destabilizing agents have been added since at that time a rapid dispersion of the newly added ingredients in the sensitized latex must be effected immediately before the pouring operation. For example, after the latex foam has attained the desired consistency and density, sensitizing ingredients, such as a paste of zinc oxide and sodium silicofluoride, are added and thoroughly mixed in the foam in such proportions that the foam will become set or coagulated within two minutes. Accordingly, means are provided for ready withdrawal of the whip from the container and for withdrawal of the container from the apparatus so that the pouring operation may be carried out immediately.

Referring to the drawings, a present preferred embodiment of the apparatus is illustrated, in which:

Fig. 3 is a cross-sectional view taken along line 3—3 of Fig. 2, parts being omitted;

Fig. 4 is a cross-sectional view showing a detail of the scraper, taken along line 4—4 of Fig. 2;

Figure 2:
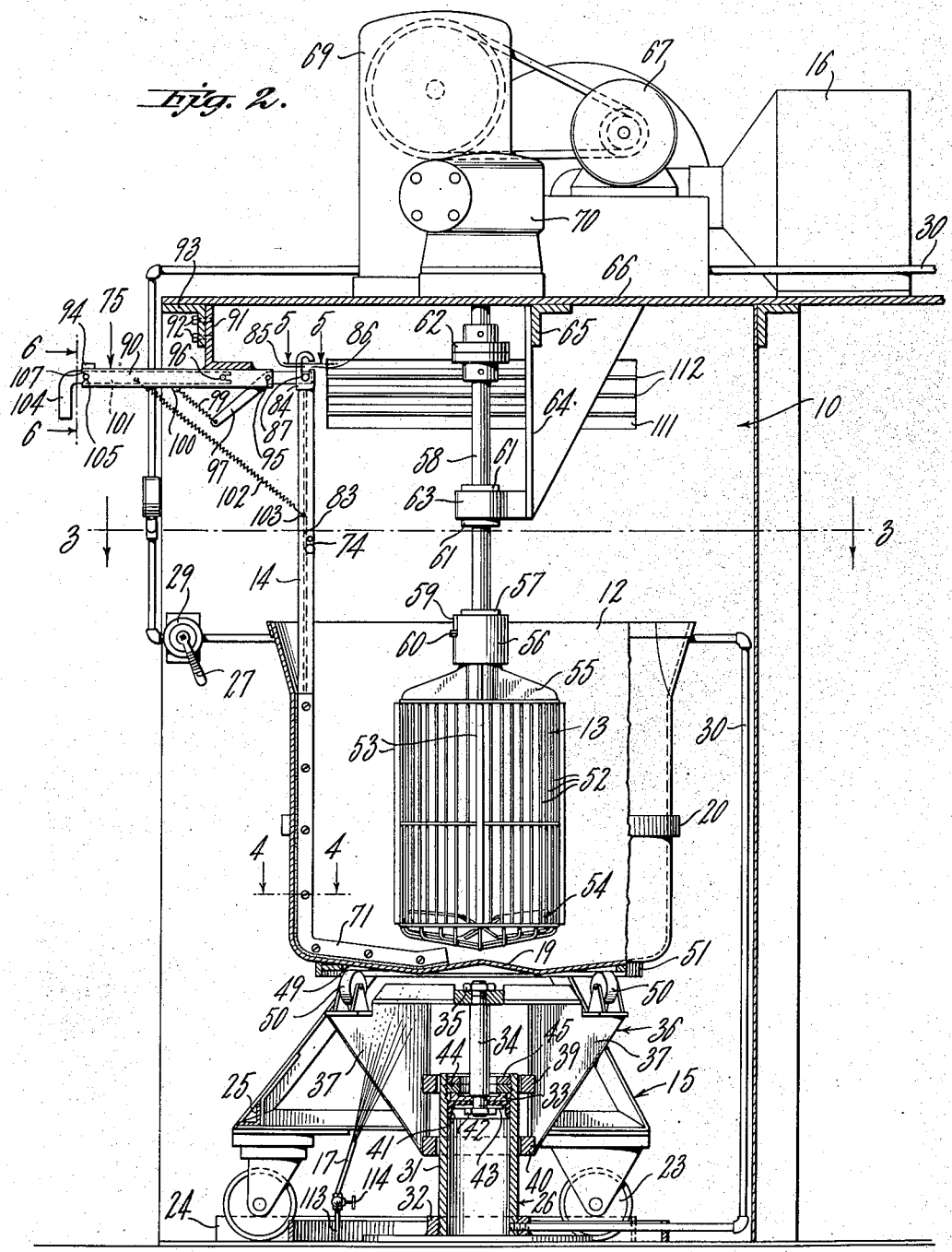
Fig. 2 is a cross-sectional view taken along line 2—2 of Fig. 1, a portion of the container being broken away.

Figs. 5 and 6 are detailed cross-sectional views of the supporting means for the scraper, taken respectively along the lines 5—5 and 6—6 of Fig. 2; and Fig. 7 is a detailed elevational view of a portion of the supporting means for the scraper, with the front plate removed.

Figure 1:
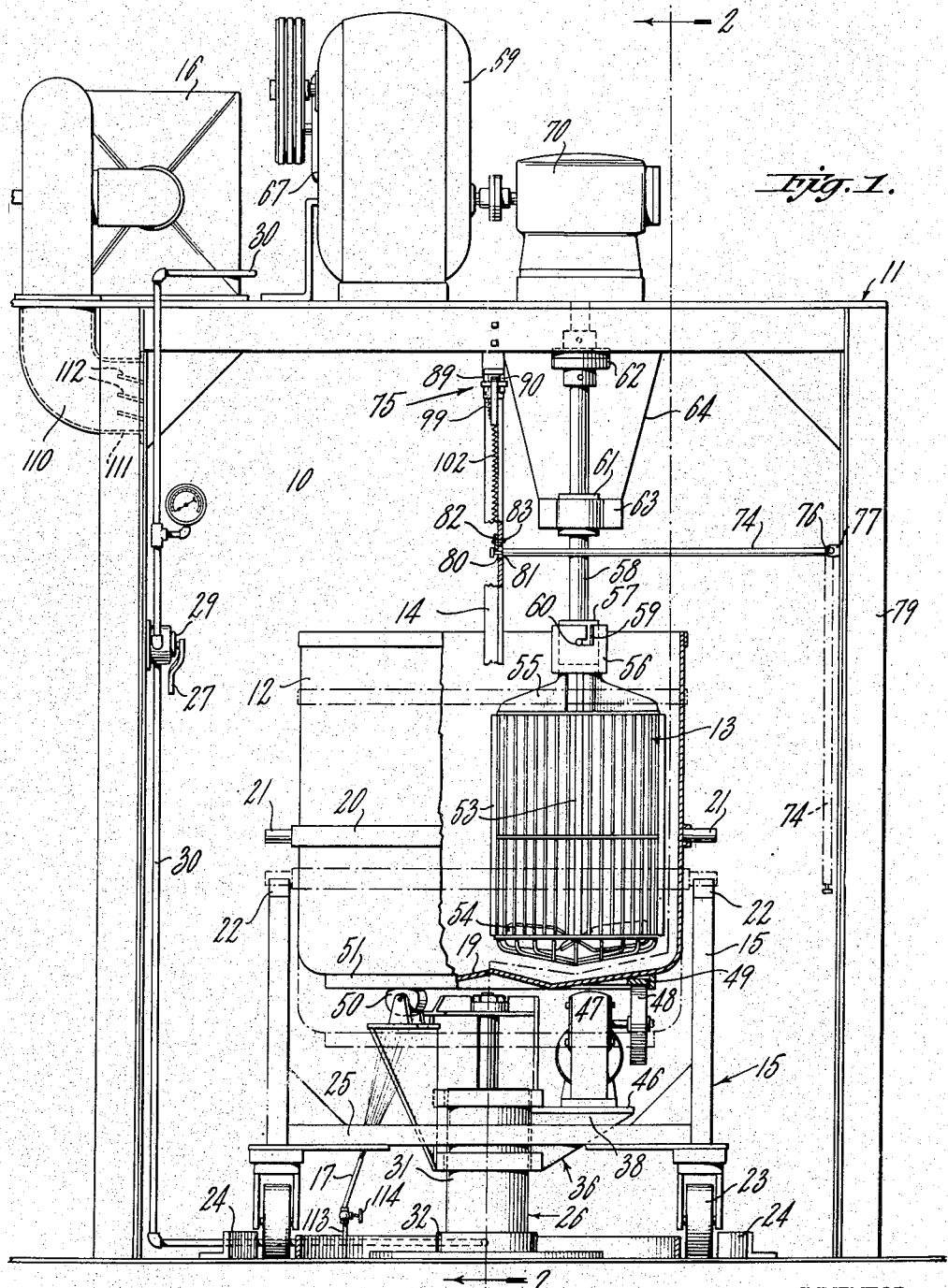
Fig. 1 is a front elevational view of the mixing and conditioning apparatus, portions being broken away.

Referring to Figs. 1, 2 and 3, a chamber 10 is defined by a frame or superstructure 11 which supports and encloses the mixing apparatus which comprises generally a container 12 and driving and elevating means therefor, a whip 13 and associated driving means, a scraper 14, and a truck 15 for supporting the container when in transit. Conditioning means associated with the chamber 10 include a blower 16 for maintaining constant temperature within the material in the tank and for removing volatile constituents such as ammonia therefrom, and a steam jet 17 for heating and/or humidifying the atmosphere within the chamber surrounding the container.

The container 12 is preferably in the form of a lipped cylindrical tank having the central portion 19 of its floor raised so that a stagnant pool of liquid will not collect in that vicinity. An annular band 20 secured around the container is provided with a pair of trunnions 21, 21 which are adapted to engage corresponding sockets 22, 22 on the truck 15 which is provided with wheels 23 for rolling the container in and out of the chamber 10. Fig. 1 shows in dotted lines the position of the container when mounted on the truck. The floor beneath the superstructure is provided with guideways 24 for accurately positioning the truck. An angle iron 25 braces the rear of the truck but the forward portion thereof is unobstructed so that the truck may straddle the lifting mechanism on the floor of the chamber without interfering therewith.

In order to place the container 12 in operating position, an elevator 26 may be raised or lowered by turning a handle 27 to open or close a valve 29 in a fluid pressure line 30, such as compressed air, connected to the interior of a cylinder 31 supported by a base 32 secured to the floor. A piston 33 (Fig. 2) operates vertically within the cylinder 31 to raise and lower a piston rod 34 secured, as by a nut 35, to a vertically movable supporting frame 36 supported by brackets 37 and 38 which are anchored to a pair of rings 39 and 40 which slidably engage the outer surface of the cylinder 31. The piston is provided with a gasket 41, the assembly being secured to the piston rod 34 by a nut 42 and plate 43. The piston may be withdrawn entirely from the cylinder, as for repair, by removing a threaded stop plate 44 from within the upper portion thereof. The stop plate 44 may be adjusted to control the upper limits of travel of the piston and may be secured in proper position by a threaded check plate 45.

The upper end of the bracket 38 terminates at a lower level than the bracket 37 and is surmounted by a platform 46 which supports a motor 47 for rotating a driving roller 48 engaging a flat ring 49 secured to the bottom of the container 12. The brackets 37 support free moving rollers 50 upon which the ring 49 also rests. A lip 51 projects downwardly from the exterior periphery of the ring 49 to keep the elevator and container in proper axial alignment as the container is driven by the roller 48.

The whip 13 is a frame comprising a plurality of parallel thin spaced round rods or slats 52 having a diameter of the order of $\frac{3}{16}$ inch and spaced $1\frac{3}{8}$ inches apart on their centers, arranged generally in the form of a cylindrical cage. The distance between adjacent rods is preferably greater than the diameter of a rod. Bracing bars 53 extend parallel to the rods 52 at quadrants around the whip to protect the rods when the whip is removed and tapped against the side of the container to remove excess latex. Fan blades 54 are obliquely secured to the bottom of the whip to induce upward circulation of liquid within the container as the whip rotates. The upper portion of the whip is secured by brackets 55 to a socket 56 which engages a plug 57 permanently secured to a shaft 58. The shaft is positioned eccentrically relative to the rotary movement of the container. It has been found preferable to confine the rotary movement of the whip to a space between the center and the circumference of the container, so that the whip is close to the interior wall and floor thereof. The portion of the foam passing between the whip and the wall and floor of the container is redirected by the scraper 14 toward the center of the container. The socket 56 is provided with an L-shaped notch 59 which accommodates a pin 60 extending from the lug 57 to form a bayonet slot connection. The shaft 58 carries a guide collar 61 and coupling 62, the collar 61 being axially guided by a bracket support 63 held rigid by a fin 64 secured, as by welding, to a bracket 65 mounted on the ceiling 66 of the superstructure 11. A motor 67 drives the shaft 58 at a predetermined speed through a series of speed reducers and controllers 69 and 70, in known manner.

The scraper 14 is secured so that its edge is in constant engagement with the side and bottom of the interior of the container as the container revolves. The scraper is curved at its lower portion so that it conforms to the shape of a hockey stick and its container-engaging portion is provided with a rubber or other resilient squeegee 71 securely held in position by a plate 72 and screws 73. (See Fig. 4.) The scraping edge of the squeegee tapers into a curve, in cross-section, so that friction against a travelling portion of latex foam will be minimized and large sudden changes of shape avoided; the metallic portion, in the shape of a T-iron, is held away from the wall of the container and the sharp edge of the rubber alone engages the container wall. The position of the scraper within the container is yieldably maintained by a steadying rod 74 and a disengageable support mechanism or anchorage 75, both being removably supported by the superstructure 11 and extending horizontally substantially at right angles to each other. The steadying rod 74 is pivoted at one end to a pin 76 extending through a lug 77 secured to a portion 79 of the superstructure so that it may be dropped into the vertical position when disengaged, as shown in dotted lines in Fig. 1. The other end of the rod 74 has a reduced portion 80 which fits into a hole 81 in the scraper 14 and may be locked in that position by a dog 82 rotatably secured to the scraper 14 by a rivet 83. Tangential movement, that is, movement perpendicular to the radius of the container, of the scraper relative to the container is thereby restricted, as shown in Fig. 3.

The support mechanism 75 limits the radial movement of the scraper 14 with respect to the container (see Figs. 2, 6 and 7). The upper end of the scraper is secured to a bifurcated hook member 84 having an elongated slot 85 with a connecting groove 86 which permits the entrance of a positioning pin 87 extending from a member of the anchorage 75 (see Fig. 5). The support mechanism 75 comprises a pair of vertically positioned flat plates 89 and 90 supported by a bracket 91 which is bolted at 92 to an upper horizontal member 93 of the superstructure 11. The plates 89 and 90 are connected by a block 94 at the outer end and by a pivot pin 95 near the inner end, and intermediately by a stop pin 96. The pivot pin 95 extends through a rocking support 97 permanently mounted between the plates 89 and 90. This rocking support 97 is in the shape of an obtuse angle, is provided with a resilient member, for example, a tension spring 99, at one end, and carries the positioning pin 87 at the other end. The other end of the spring 99 is secured to a lug 100 on the plate 89. A locking arm 101 extends partway between the plates 89 and 90 and is connected near its central portion to one end of a resilient member, for example, a tension spring 102, the other end of said spring being fastened to the scraper 14 at a point 103 which may be substantially midway between the hook 84 and the edge of the container 12. The ends of the springs may be connected to the various members by inserting the wire into holes provided and bending the wire to maintain the position of the spring. The locking arm 101 has a handle 104 near which is located a projecting pin 105 adapted normally to seat in grooves 106 and 107 formed in the outer ends of the plates 89 and 90, respectively (see Fig. 6). The opposite end of the locking arm has a groove 109 which engages the stop pin 96 when in position. The normal position of the locking arm is maintained by the tension spring 102 which also resiliently exerts a positive force to retain the edge of the scraper 14 in constant engagement with the side walls of container 12. The spring 99 causes a downward pressure to be exerted by the positioning pin 87 on the lower surface of the slot 85 to maintain the bottom portion of the scraper 14 in yieldable contact with the bottom of the container.

The blower 16 is connected by a duct 110 to a vent 111 having fins 112 which direct the flow of air toward the top of the container when the apparatus is in operation. Suitable means for controlling the magnitude and direction of this flow may be provided if desired.

The steam jet 17 may be fed from any convenient source of steam through a pipe 113 and controlled by a valve 114. As shown in Figs. 1 and 2, the steam may be directed toward the bottom of the container as it revolves, whereupon the air around the container will become humidified by steam condensation. If it is desired to raise the temperature in or surrounding the apparatus, the steam pressure may be increased by manipulation of the valve 114, thus applying considerable heat to the interior of the chamber. The air flowing from the vent 111 may also be heated within limits sufficient to prevent coagulation of the latex foam.

In operation latex which may have been "prefrothed" or partially foamed is elsewhere introduced to the proper height within the container 12. The container is mounted on the truck 15 by resting the trunnions 21 in the sockets 22. The truck is wheeled into the chamber 10, its position being properly determined by the guideways 24. The whip 13 is inserted into the latex foam within the container and secured in position by sliding the notch 59 over the pin 60. The handle 27 of the valve 29 is turned to admit compressed air into the cylinder 31 of the elevator 26 thereby raising the supporting frame 36 which in turn lifts the container off of the truck 15 in position ready to be rotated. The scraper 14 is placed in vertical position along the interior wall of the container and the hook 84 is hung over the positioning pin 87. The locking arm 101, which has been hanging loosely by the spring 102 from the scraper is inserted between the plates 89 and 90 so that the groove 109 engages the pin 96 and the pin 105 fits in the grooves 106 and 107, whereupon the spring 102 holds the arm 101 in position. The steadying rod 74 is then swung upward so that the neck 80 fits within the hole 81 in the scraper and the dog 82 is swung downwardly to lock the steadying rod in position. The motor 67 is then started to drive the shaft 58 which whirls the whip 13, and the motor 47 is started to drive the drive roller 48 which rotates the container in the same direction as the whip.

As the container rotates, different portions of its floor may be at different levels as they pass below the scraper 14, thereby raising or lowering the scraper. This irregularity is compensated for since the positioning pin 87, by virtue of the tension spring 99, constantly exerts a downward pressure on the bottom of the slot 85, but at the same time the spring-positioned rocking support 97 permits the pin to ride upward as the scraper is raised. In this manner the scraper is kept in permanent contact with the interior of the container, both along the interior wall and along the floor thereof, during the entire mixing and whipping operation.

As the whip 13 rotates, due to its open work construction of small rods with relatively large spaces between, considerable air may be beaten from the atmosphere into the latex composition, and the apparent density thereof may be lowered by prolonging the whipping, if desired. At the same time the bubbles which have already been formed in the latex during the "prefrothing" operation are subjected to enough mechanical action and turbulence to bring them all to substantially the same size; excessively large bubbles will thus be reduced in size. Small quantities of the latex foam may be removed in order to determine when the proper apparent density has been attained, after which the destabilizing or sensitizing ingredients may be introduced for rapid dispersion throughout the latex composition. This dispersion is augmented by the vertical force imparted by the fan blades 54 in the lower portion of the whip. The mixing is then continued for 4 minutes after the sensitizing ingredients have been added to the latex foam composition in the form of a paste, after which the mixing is stopped as hereinafter described. It will be noted that the whip is preferably positioned close to the walls of the container in order to avoid the tendency of the unmixed portions of the composition to segregate around the edges. This segregation or building up of a film or layer of unmixed or untreated composition is made impossible since the scraper continually drives the liquid material from the relatively quiescent zone along the edge of the container to the center thereof where it will be engaged by the whip. The function of the scraper has been found practically indispensable when dealing with most latex compositions since with such coagulable materials it is of primary importance that local premature coagulation shall not take place. It will also be noted that no excessive friction or compression is applied by the apparatus, a characteristic which would not be of particular importance if it were not necessary to provide against the ever present danger of coagulation due to any of the reasons discussed above.

While the whipping and mixing operation is in progress the blower 16 is in operation constantly directing the flow of air down on to the upper surface of the agitated latex foam. The air blown in is preferably cooled and reduces the temperature around the container, thus compensating for the mechanical production of heat within the container by the beating operation. Since the ordinary commercial latex is stabilized with volatile matter such as ammonia, some of the ammonia is liberated upon vigorous agitation of the composition. As the ammonia is liberated, the gust of air from the vent 111 assists in reducing a portion of the ammonia content from the latex, and in removing the ammonia from the chamber. This feature of the invention is especially applicable when the compounding operations fail to remove appreciable quantities of the ammonia before the latex is introduced into the container.

When, as in cold weather, the temperature and humidity of the latex are low, the steam valve 114 may be opened to direct live steam at the bottom of the container. This raises the temperature and humidity within the chamber.

When the sensitizing ingredients have been thoroughly dispersed the motors 47 and 67 are stopped, the scraper is removed, the whip is disengaged from the shaft 58 and removed from the container, the elevator 26 is lowered and the trunnions 21 again are lowered in the sockets 22. The truck is then wheeled out of the chamber 10 to a pouring station where the container 12 may be tipped to pour the sensitized foamed latex into molds. Since the entire pouring operation must be accomplished within a few minutes (depending on the proportion of sensitizing ingredients) after the sensitizing operation, the maneuverability of the present apparatus is essential.

While I have shown and described a present preferred embodiment of the invention, it is to be understood that it may be otherwise embodied within the spirit thereof and within the scope of the appended claims.

Having thus described my invention, what I claim and desire to protect by Letters Patent is:

1. In a mixing mechanism for processing latex foam without coagulation thereof, a frame, a rotatable container, a scraper, means to sustain said scraper against the resistance of the mix as the container rotates, means for yieldably retaining the scraper in normal position against the interior wall of the container during rotation thereof, and a removable anchorage secured to said frame for positioning said retaining means, said anchorage and sustaining means having readily detachable connections relative to the scraper and frame respectively to permit quick disassembly of the mechanism before coagulation sets in.

2. In a mixing mechanism, a frame, a rotatable container, a scraper engaging the interior wall and floor of the container, and supporting means for resiliently retaining the scraper in contact with said walls during rotation of the container, said supporting means comprising a plate secured to said frame, a locking member removably engaging said plate and a resilient member connecting said locking member with said scraper and tending to retain said locking member in engagement with said plate and tending to retain said scraper in contact with the interior wall of the container.

3. A stirring mechanism for processing latex foam comprising a container, a whip comprising spaced members and rotatable within the container, a scraper engaging the interior wall of the container, and independent means for simultaneously rotating the container and the whip in the same direction, whereby the scraper acts constantly to direct latex foam from a quiescent zone into the path of the whip.

4. A stirring mechanism for processing latex foam comprising a rotatable container, a whip comprising spaced members and rotatable within the container, a scraper engaging the interior walls of the container, independent means for rotating the container and the whip at the same time and in the same direction, and means for retaining the scraper in cooperative engagement with the interior wall and floor of the container during rotation thereof, whereby the scraper acts constantly to direct latex foam from a quiescent zone into the path of the whip.

5. A stirring mechanism for agitating a foamable and coagulable liquid having the characteristics of latex foam comprising a rotatable container, non-compressive agitating means comprising a rotatable whip within the container, and a scraper engaging the interior of the container during rotation thereof to prevent local coagulation of the liquid therein, and means to rotate the container relatively to the agitating means and scraper whereby the scraper acts constantly to direct foamable liquid from a quiescent zone into the path of the whip.

6. A stirring mechanism for processing a foamable and coagulable liquid without coagulating said liquid comprising a rotatable container, non-compressive agitating means within the container, means engaging the interior of the container to prevent local coagulation of the liquid therein during rotation of the container, and means cooperating with the interior and exterior of said container for controlling the temperature and humidity of said liquid during agitation to prevent coagulation of said liquid.

7. In apparatus for processing coagulable foamed liquid having the characteristics of latex foam, a rotatable container, a whip comprising spaced members, means for rotating the whip co-directionally with and within the container, means engaging the interior of said container to prevent local coagulation of the liquid on said interior surface, and means operating directly on the interior and exterior of said container during rotation thereof for controlling the temperature and humidity of said liquid to prevent coagulation of the liquid within said container during processing.

8. In a mixing and whipping apparatus for processing latex foam, a rotatable container, an independently driven non-compressive mixing and whipping member insertable within the container, means for simultaneously and co-directionally driving the container and said member within said container, said member comprising a frame of vertically disposed wires of relatively small diameter and a substantially horizontal blade obliquely secured thereto to impart vertical agitation to the latex foam during rotation thereof, and means for scraping the interior side wall and floor of the container during rotation to prevent coagulation of the latex foam.

9. In apparatus for processing a mechanically and thermally coagulable foamed liquid having the coagulative characteristics of heat-sensitive latex foam, a rotatable container, non-compressive agitating means within the container, means for preventing mechanical coagulation of the liquid comprising a curved scraper engaging the inner wall of the container to constantly prevent accumulation of deposit from the liquid therealong during rotation of the container, and cooling means directly engaging the container to prevent thermal coagulation of the liquid during rotation of the container, due to heat derived from the operation of said scraper.

10. In apparatus for mixing and whipping foamed liquid having the characteristics of latex foam and without coagulating the foam, a container and rotating means therefor, a whip comprising a frame of spaced parallel rods and obliquely arranged blades for imparting other than rotary motion to the liquid, rotating means for said whip, a scraper having a resilient edge extending into said container, and resilient means associated with said scraper for maintaining the edge of the scraper in contact with the interior wall of the container during rotation, whereby the scraper acts constantly to direct foamed liquid from a quiescent zone into the path of the whip.

11. In apparatus for processing foamed latex a chamber, means for controlling the temperature and humidity within the chamber to prevent coagulation of the foamed latex, a rotatable container for said foamed latex, means for quickly introducing and removing the container relative to the chamber before coagulation sets in, agitating means rotatable within said chamber during rotation thereof, and means within the chamber for positioning the container relative to the agitating means.

12. In apparatus for processing a coagulable foamed liquid such as latex foam containing a stabilizing agent, a rotatable container for said liquid, a non-compressive whip rotatable within said container, means for preventing local accumulation of foamed liquid within the container during rotation thereof and of said whip, means operating directly upon the upper surface of the liquid within the container to remove a portion of the stabilizing agent from the liquid, said whip being adapted to continuously present different portions of the liquid to said removing means, and means for preventing coagulation of the liquid by controlling the temperature and humidity within said apparatus during removal of said stabilizing agent.

13. In apparatus for preparing latex foam containing a stabilizing agent without coagulation of the foam, a rotatable container for the latex foam, means for rotating the container, non-compressive means associated within the container for simultaneously mixing and whipping the latex foam and means capable of removing portions of the stabilizing agent therefrom during the operation of the mixing and whipping means, and means for preventing coagulation of the latex foam during the removal of the stabilizing agent.

14. In a mixing mechanism for latex foam, a rotatable cylindrical container, a non-compressive whip rotatable within said container between the center and interior wall thereof so that there is a space along said wall where unmixed latex foam may collect, a scraper for diverting said unmixed latex foam into the path of said whip as the container rotates.

15. In a mixing mechanism, a frame, a rotatable container, non-compressive mixing means, a scraper, and means for supporting said scraper against the walls and floor of said container during rotation thereof, said means comprising an arm secured to said frame and to said scraper to prevent tangential movement of the scraper, and resilient means removably supported by said frame to restrict radial movement of said scraper relative to said container, whereby the scraper acts consequently to direct mixed liquid away from a quiescent zone within the container.

16. Detachable mounting apparatus for holding a scraper in engagement with the walls of a rotating container, comprising a fixed blade, a scraper, a locking member removably engaging said blade and a resilient member adapted to connect said locking member with the scraper, said resilient member being adapted to retain said locking member in engagement with said blade and to exert a positive force on said scraper against said walls.

17. In apparatus for processing latex foam without coagulation during said processing, a scraper comprising an elongated member adapted to conform generally to the interior surface of a container for latex foam and to be scraped, and a resilient member secured thereto and presenting a scraping edge which tapers into a curve, said curved edge permitting divergence of latex foam and preventing coagulation thereof normally due to mechanical agitation.

18. A whip comprising a cylindrical cage, the cylindrical surface of which comprises a plurality of thin longitudinally disposed parallel spaced bars, one end of said cage comprising thin spaced bars forming a bottom of the whip, and at least one fan blade secured inside said cage with its blade surface obliquely disposed to said bottom end.

EDWARD H. CLARK.